United States Patent [19]

Matsuzawa et al.

[11] Patent Number: 5,079,135
[45] Date of Patent: Jan. 7, 1992

[54] OPTICAL RECORDING MEDIUM

[75] Inventors: Nobuyuki Matsuzawa; Nobutoshi Asai; Shinichiro Tamura; Noriyuki Kishii; Seiichi Arakawa, all of Kanagawa, Japan

[73] Assignee: Sony Corporation, Tokyo, Japan

[21] Appl. No.: 458,457

[22] Filed: Dec. 28, 1989

[30] Foreign Application Priority Data

Dec. 29, 1988 [JP] Japan .................. 63-334295
Dec. 29, 1988 [JP] Japan .................. 63-334296

[51] Int. Cl.$^5$ .................. G03C 1/00; G03C 1/492
[52] U.S. Cl. .................. 430/495; 430/270; 430/945; 346/135.1
[58] Field of Search ........... 430/495, 270, 945; 346/135.1

[56] References Cited

U.S. PATENT DOCUMENTS

| | | | |
|---|---|---|---|
| 4,230,939 | 10/1980 | de Bont et al. | 430/945 |
| 4,305,081 | 12/1981 | Spong | 430/945 |
| 4,536,471 | 8/1985 | Nishi et al. | 430/495 |
| 4,538,159 | 8/1985 | Gupta et al. | 430/945 |
| 4,950,579 | 8/1990 | Debe et al. | 430/290 |
| 4,957,854 | 9/1990 | Oguchi et al. | 430/945 |

*Primary Examiner*—Charles L. Bowers, Jr.
*Assistant Examiner*—Ashley I. Pezzner
*Attorney, Agent, or Firm*—Hill, Van Santen, Steadman & Simpson

[57] ABSTRACT

An optical recording medium is disclosed, in which an optical recording layer and a reflective layer are formed on a transparent substrate. The recording layer contains a first compound having absorption or a recording laser light having a predetermined wavelength, and a second compound having substantially no absorption for a laser light having the predetermined wavelength and decomposable upon heat generation by the laser light in the optical recording layer.

9 Claims, 4 Drawing Sheets

OPTICAL RECORDING MEDIUM

BACKGROUND OF THE INVENTION

This invention relates to an optical data recording medium having an organic dye as the recording material and, more particularly to such a recording medium which has improved reflectivity.

Recently, studies have been conducted on the optical data recording system in the field of data recording. This optical data recording system has a number of advantages in that recording and reproduction may be made in a contact-free mode, a recording density can be made which is higher by more than one digit order as compared with the magnetic recording system may be achieved and the system adapts to memories which are dedicated to reproduction, such as write once type memories or rewritable type memories. Thus the optical data recording system is employed not only in industrial applications but in consumer equipment which enables a large capacity file to be realized at lower costs.

With the write once type memory, data may be recorded on and reproduced from the memory by the ultimate user. Since the data, once written, cannot be erased, this type of memory is mainly used as a file for long-term data storage. For recording, local irreversible physical changes of the recording layer, brought about by the absorption of the light energy by the recording material, followed by conversion of the absorbed energy into thermal energy, is utilized. These irreversible physical changes may result in changes in shape, caused by formation of pits, changes in surface properties and changes in the crystal state of the recording layer.

The recording materials employed in the presently commercialized write once type optical data recording medium are mostly tellurium or tellurium alloys. However, organic dyes are recently attracting attention in place of these tellurium materials because profitability and production of the recording medium may be improved. The organic dyes are required to exhibit conspicuous absorption in the near-infrared region which is the wavelength region of the semiconductor laser employed for recording and reproduction. Up to now, methine-base dyes, benzenedithiol nickel complexes, metal phthalocyanin dyes or naphthoquinone dyes have been known and have been used as the organic dyes.

In order for desirable recording and/or reproducing characteristics to be achieved in the optical data recording medium, the following conditions need to be satisfied in connection with the physical properties of the recording materials. For achieving high recording sensitivity, it is necessary that the rate of light absorptivity be high, that the thermal capacity and conductivity be low and that thermal changes for recording occur at lower temperatures. On the other hand, for achieving high reproduction sensitivity, it is necessary that changes in reflectivity before and after recording be high, that the shape of the formed pits be smooth and that a small amount of noise be produced. Among the above desirable conditions, high absorptivity and high reflectivity are the most fundamental optical properties.

However, the organic dyestuffs which have so far been known exhibit only low reflectivity of 30 to 40 percent at most, when formed into a film, such that a sufficient reproduction sensitivity cannot be realized. When it is attempted to reproduce an optical data recording medium, formed of organic dyestuffs as the recording material, using a reproducing apparatus adapted for reproducing an optical disk comprised of a substrate having pits formed thereon and an aluminum reflective film formed on the substrate, or so-called compact disk, it is necessary for the reflectivity to be at least at high as that of the currently commercialized compact disk, which is 70 percent or more at 780 nm. However, in a manner different from the compact disk, which is dedicated to reproduction, the write once type optical data recording medium has a drawback in that the reflectivity is improved at the cost of the recording sensitivity. The reason for this is, if a high reflectivity is to be achieved at a certain wavelength, the rate of light absorption at such wavelength needs to be low, however, the irreversible physical changes cannot be brought about effectively if the light absorptivity is lowered. In order to solve this problem, organic dyestuffs need to be found in which the amount of the absorbed light energy, even if small, may be converted effectively into thermal energy so as to bring about the irreversible physical changes.

It is extremely difficult to find such dyes, among the above enumerated organic dyes, which exhibit satisfactory properties for the recording material, such as resistance to light degradation, has high weatherability and has excellent solubility in general-purpose solvents.

On the other hand, with cyanine dye, which is attracting attention as the recording material, since the laser wavelength falls on the skirts of the absorption region of the dyestuff material, the absorption and hence the reflectivity tend to be changed significantly with only small changes in wavelength. Cyanine dye, for example, exhibits reflectivity at 780 nm which differs by about 10% from that at 770 nm. Since the allowable wavelength range of a laser diode is about 780+10 nm, it is difficult to obtain the same reflectivity for all of the laser diodes, and thus the signal intensity may drastically differ from one reproducing unit to another.

OBJECT AND SUMMARY OF THE INVENTION

In view of the foregoing, it is an object of the present invention to provide an optical recording medium which is excellent in both recording and reproducing characteristics due to provision of a recording layer which exhibits a high reflectivity at the wavelength of a semiconductor laser and which is subject to smaller fluctuations in the vicinity of such wavelength and may undergo physical changes with only a small amount of light energy.

As a result of the research for accomplishing the above object, the present inventors have found that the optical conditions of the utilizable substances can be obtained by mixing two or more substances which have different optical constants as the recording materials, and that the and/or reproducing properties can be improved by selecting those substances which have simultaneously satisfactory recording and reproducing characteristic simultaneously.

On the basis of this finding, the present invention provides an optical recording medium having a recording layer and a metal reflective layer which are sequentially formed on a substrate, wherein said recording layer contains a substance which substantially absorbs laser light and which comprises a substance which is substantially deteriorated and decomposed when heated.

DESCRIPTION OF THE PREFERRED EMBODIMENTS

Figure 1:
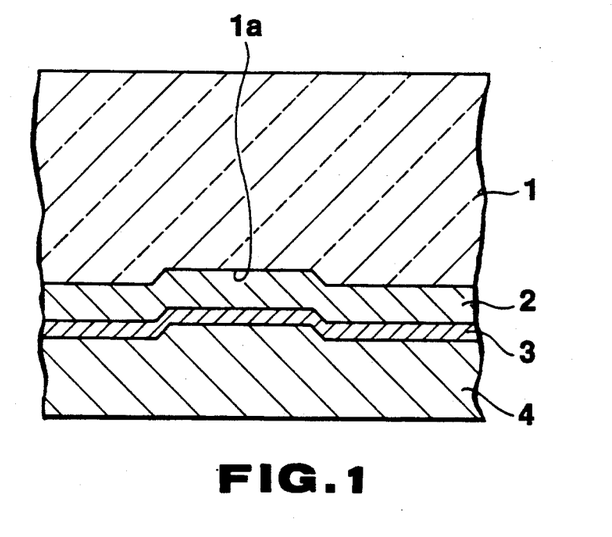
FIG. 1 is an enlarged cross-sectional view showing an example of an optical recording medium according to the present invention.

The optical recording medium according to the present invention is shown in FIG. 1, and includes a transparent base plate or substrate 1, on which a pre-groove 1a is formed if desired. A recording layer 2 for absorbing the semiconductor laser light to effect photo-thermal conversion, is mounted on the substrate and a metallic reflective layer 3 is provided for increasing the reflectivity. Layers 2 and 3 are laminated in the order shown on the substrate 1. A protective optical layer 4, formed of a UV curable resin or thermosetting resin, may be provided on the reflective layer 3.

There are no limitation to the substrate materials as long as they are employed for the ordinary optical recording medium. As the substrate materials, plastics such as polycarbonate or acrylic resin, or glass, are preferred.

The metallic reflective layer 3 is formed on the recording layer 2 by depositing a metal layer exhibiting high reflectivity at 780 nm by a vacuum thin film forming technique. Metals such as Au, Cu, Al or Ag may be employed. The thickness of the metal reflective layer 3 is selected to be in the range of from 300 to 2000 Å. With the film thickness less than 300 Å, the effect in increasing the reflectivity of the optical recording medium is insufficient, whereas, when the film thickness is in excess of 2000 Å, the film forming operation becomes a time-consuming operation which decreases production. Moreover, it is highly likely that only an insufficient amount of heat energy is stored in the recording layer 2.

On the other hand, the recording layer 2 has organic dye material as the recording material. As such dye material, a mixture of two substances which will be later described are used for simultaneously achieving high reflectivity and high recording density.

The first of these substances, referred to as component 1, is a substance which mainly absorbs the laser light. For the component 1, those substance which show absorption at the laser wavelength and have a complex refractive index $n^* = n + ki$, where the value of n, which stands for a real part and is what is called the refractive index, is preferably 1.5 to 3.2, i stands for an imaginary part and has value of k, which is an extinction coefficient, and is 0.3 or more and preferably is in the range of from 0.3 to 2. This component 1, which has its peak of absorption closer to the laser wavelength, is preferred, since the value of k then fluctuates to a lesser extent in the laser wavelength range and the reflection spectrum becomes flatter. It is however sufficient that the absorption band overlaps to some extent the laser wavelength range. Since it is necessary for the component 1 to absorb the laser light effectively at the time of recording, it is desirable that the absorption not be changed by light irradiation or by the temperature increases in the order of 300° C.

The substances satisfying these conditions may include by cyanine base dyes, metal complex base dyes, phthalocyanine dyes or naphthalocyanine dyes. Of these, phthalocyanine and naphalocyanine dyes are preferred. Above all, in view of the thermal resistance, sensitivity and solubility in general-purpose solvents, substituted aminophthalocyanines, such as hexylaminophthalocyanine, propylaminophthalocyanine, dodecylaminophthalocyanine or benzylaminophthalocyanine, are most preferred.

The substituted aminophthalocyanine which employed as the component is the compound having the following formula (I):

The compound represented by the formula (I) is what is called a free base type substituted aminophthalocyanine dye. It is noted that the above compound may be in the form of a metal complex with two hydrogen atoms on two nitrogen atoms disposed at the most central portion of the phthalocyanine skeleton being substituted by a metal atom. In the above formula, $K_1$ to $K_4$ stand for a hydrogen atom, an amino group, a substituted amino group or the like, with at least one of $K_1$ to $K_4$ being however a substituted amino group. If two or more of $K_1$ of $K_4$ are substituted amino groups, these substituted amino groups may be the same as or different from each other.

The substituted amino group means the amino group having at least one of the two hydrogen atoms of the amino group substituted by substituents selected from the group consisting of straight-chained, side-chained or cyclic alkyl groups, hydroxylalkyl groups, benzyl groups and alkoxy-modified benzyl groups typified by a p-methoxybenzyl group. Although there is no specific limitation on these substituents, the substituents applicable to the optical recording medium of the present may include methyl, ethyl, n-propyl, isopropyl, n-butyl, isobutyl, tert-butyl, n-pentyl, isoamyl, tert-amyl, n-hexyl, n-heptyl, n-octyl, n-nonyl, n-decyl, n-dodecyl, cyclopentyl, cyclohexyl and cycloheptyl groups. The above substitutents may also include the above mentioned benzyl groups or derivatives thereof, hydroxymethyl, hydroxyethyl, hydroxypropyl, hydroxybutyl, hydropentyl and hydroxyhexyl groups.

The above mentioned substituted aminophthalocyanine has an absorption band in the wavelength range of 780 nm of the semiconductor laser beam serving as the recording beam. This is the property which differs markedly from the conventional phthalocyanine dyes which show absorption only in the state of association and which allows mixing with the binder or other organic dyes.

On the other hand, the above mentioned substituted aminophthalocyanine has a thermal decomposition temperature of 370° C. or higher and is melted at lower than 300° C. Thus there is no risk of thermal decomposition under the normal working conditions with the use of the semiconductor laser beam, so that the superior photo-thermal conversion characteristics are not lost.

As typical of the substituted aminophthalocyanine, tetrahexylaminophthalocyanine can be synthesized in accordance with the following reaction route:

(1)

(2)

(3)

(4)

First, nitrophthalodinitride (1) was acted on by an alkali metal alcoholate and thereby condensed to produce tetranitrophthalocyanine (2). If the compound (1) is acted on by a metal or a metal salt, instead of by the alkali metal alcoholate, metal complexes may be produced by a heating reaction.

The compound tetranitrophthalocianine (2) was then reduced with sodium sulfide Na₂S in hot water in the presence of calcium chloride to produce tetraaminophthalocyanine (3) at a high yield.

Figure 4:
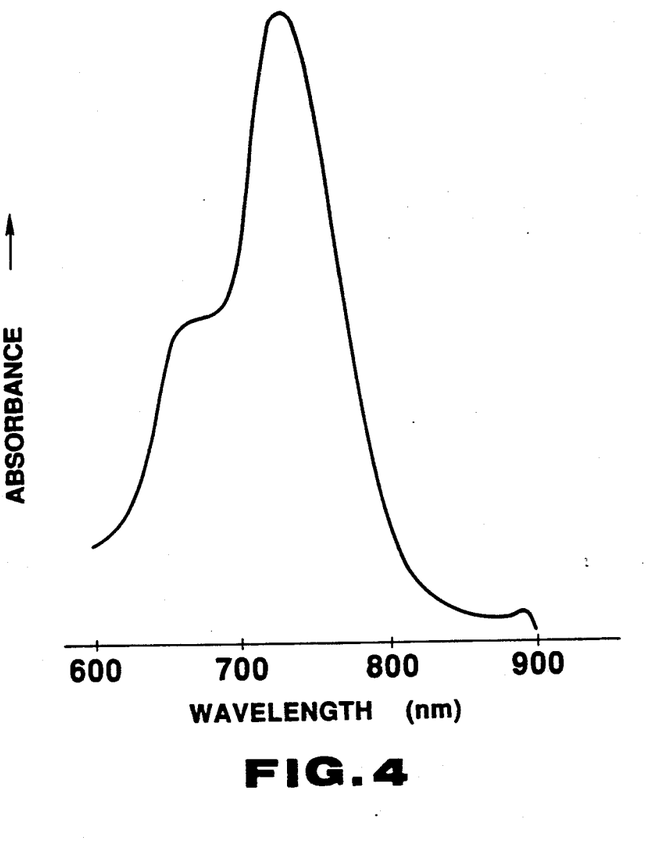
FIG. 4 shows an absorption spectrum of tetrahexylaminothalocyanine.

The compound tetraaminophthalocyanine (3) was then acted on by 1-bromo-n-hexane in the presence of both solid sodium hydroxide and tetra(n-butyl) ammonium to synthesize tetrahexylaminophthalocyanine (4). FIG. 4 shows an absorption spectrum of tetrahexylaminophthalocyanine (4), as measured in acetone. It is seen from this figure that this compound, while having a maximum absorption wavelength of 750 nm, exhibits a sufficient absorption at a wavelength of 780 nm which is the wavelength for a semiconductor laser. The complex refractive index of this compound in the solid state was 1.996−0.468i(780 nm). These optical properties as the dye per se were not observed with the known phthalocyanine derivatives.

By using various alkyl halides in place of hexyl bromide, corresponding substituents may be introduced on the nitrogen atom of the amino group. The present inventors prepared tetraprophylaminophthalocyanine and tetradodecylaminophthalocyanine similarly with the use of 1-bromopropane and 1-bromo-n-dodecane as the alkyl halide. It was confirmed that these compounds, when used alone, were also able to absorb the semiconductor laser beam sufficiently. The complex index of refraction of the former compound at 780 nm was 2.245−0.649i, whereas that of the latter compound at the same wavelength was 1.844−0.363i.

The second substances, referred to as component 2, with $k<0.05$ and preferably $k \leqq 0.019$ and $n=1.5$ to 3.2, exhibit almost no absorption at the laser wavelength. The component 2 needs to be deteriorated and decomposed at the time of rapid temperature rise due to laser irradiation so as to produce a gas to cause the recording layer to be deformed significantly. Thus the component 2 is preferably decomposed or gasified at 100° to 300° C. to emit a gas and so as to be superior in weatherability.

Among the cyanine dyes not exhibiting absorption at this laser wavelength are those in which heterocyclic rings, such as indoline, benzoindoline, benzothiazoline and naphthothiazoline rings, are coupled by a C-5 pentamethine chain. The general formulae for these five kinds of the cyanine dyes are shown below.

The cyanine dye having the indoline ring is represented by the formula (II)

wherein $R_1$ and $R_2$ each denote a $C_1$ to $C_{20}$ alkyl group, $R_3$ denotes a hydrogen atom, a halogen atom, an ulkyl group or an alkoxy group. $R_1$ and $R_2$ may be the same or different. $X_1$ denotes halogen ions such as $I^-$, $Br^-$ or $Cl^-$, $ClO_4^-$, or an ion of substituted benzenesulfonic acid, and Me denotes a methyl group.

The cyanine dye having the benzoindoline ring in represented by the formulae III and (IV)

where $R_4$ denotes a hydrogen atom, a halogen atom, an alkyl group or an alkoxy group.

The cyanine dye having the benzothiazoline ring is represented by the formula (V)

while the cyanine dye having the naphthothiazoline ring is represented by the formula (VI)

These cyanine dyes exhibit the absorption maximum at the wavelength range lower than −690 nm, when measured in a methanol solution.

Specific examples of these compounds are as follows.

TABLE 1

| | Structural Formula | $\lambda_{max}$ (nm) |
|---|---|---|
| Compound A | | 680 |
| Compound B | | 680 |
| Compound C | | 690 |
| Compound D | | 666 |
| Compound E | | 680 |

Figure 5:
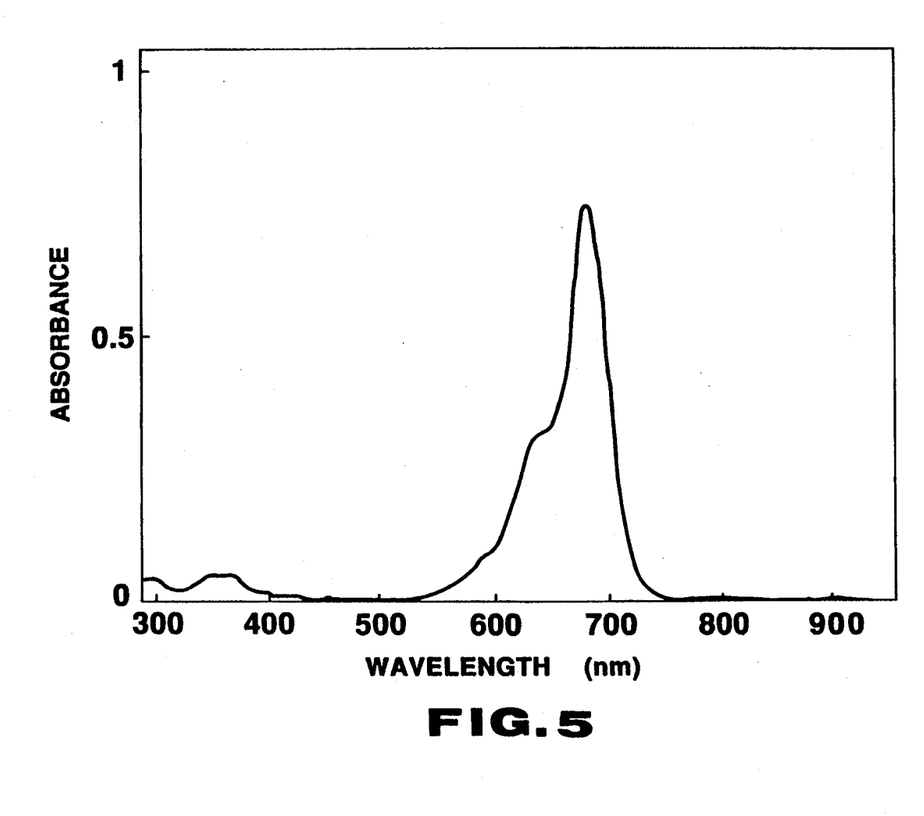
FIG. 5 is an absorption spectrum of cyanine dye of the compound A in Table I.

FIG. 5 shows absorption spectrum of the compound A in the methanol solution. It is seen from this figure that the compound A barely shows absorption at the laser wavelength.

The coumarine dyes have the following structures.

(1) coumarin

(2) 7-Diethamino-4-methylcoumarin

(3) 3-2-(Diethylamino)ethyl-7-hydroxy-4-methylcoumarin hydrochloride

(4) 7-hydroxy-4-methylcoumarin (5) 7-amino-methylcoumarin

(6) 7-amino-4-(tufluoromethy)coumarin

In addition to the above cyanine dyes and coumarine dyes, the following substances may be used as the components 2.

i) alantoin base dyes (1) Acid Black 48 (decomposition temperature, 275° C.; $\lambda_{max}$, 663 nm)

(2) Oil Blue N (decomposition temperature, 210° C.)

ii) azo base dyes (1) Acid Yellow 29 (decomposition temperature, 238° C.; $\lambda_{max}$, 407 nm)

(2) Acid Red 88 (decomposition temperature, 280° C.; $\lambda_{max}$, 505 nm)

iii) thiazine base dyes (1) Azure B (decomposition temperature, 205° C.)

(2) Methylene Blue iv) triphenylmethane base dyes (1) Brilliant Green (decomposition temperature, 210° C.; $\lambda_{max}$, 625 nm)

(2) Thymol Blue (decomposition temperature, 221 to 224° C.; $\lambda_{max}$, 594 nm)

-continued v) acridine dyes (1) Acrydine Orange (decomposition temperature, 165° C.: $\lambda_{max}$, 488 nm)

(2) Acridine Yellow ($_{max}$, 442 nm)

vi) oxazine base dyes (1) Cresyl Violet (decomposition temperature, 140 to 143° C.; $\lambda_{max}$ 396 nm)

vii) bisazo base dyes (1) Sudan III (decomposition temperature, 199° C.; $\lambda_{max}$, 507 nm)

(2) Direct Red 21 (decomposition temperature, 240° C.; $_{max}$, 508 nm)

-continued viii) xanthene base dyes (1) Rose Bengal (decomposition temperature, 184° C.; $_{max}$, 559 nm)

(2) Rhodamine 6G ($_{max}$, 524 nm)

The recording layer 2, containing the aforementioned components 1 and 2, is coated on the base plate 1 in the form of a solution in a suitable solvent. The thickness of the recording layer 2 is preferably selected such that a reflectivity of 70 percent or higher is attained by interference. Thus it is selected to be λ/2n or in the vicinity of integer multiples thereof, wherein λ denotes the wavelength of the laser light employed for recording. The mixing ratio of the components 1 and 2 may differ with the kind of the selected substances and may be suitably selected by taking, for example, the reflectivity or the recording density into account. For example, it may be selected so that the values of n and k of the complex refractive index will be $1.5 \leq n \leq 3.2$ and $0 < k \leq 0.2$, respectively. The organic solvents are suitably selected so that the components 1 and 2 are soluble therein and so that no injury is done to the base plate 1.

The above described optical recording medium may have a total thickness of 1.5 mm or less which is equal to that of the commercial compact disk. For an optical recording medium having a protective film formed on an organic dye layer, it was proposed heretofore to provide a gap between the organic dye layer and the protective film so as to prevent inhibition of pit formation by physical changes. However, this results in the total thickness of the recording medium increasing excessively so as to make it impossible to reproduce the recording medium with some of the currently commercialized reproducing apparatus for a compact disk or CD-ROM so that they are not interchangeable. Conversely, according to the present invention, satisfactory recording and/or reproduction may be achieved with the arrangement of FIG. 1 on account of the excellent properties of the recording layer 2 which result in a decreased thickness of the recording medium.

The optical recording medium of the present invention has its recording layer formed mainly by two kinds of materials, which are components 1 and 2, with the component 1 mainly absorbing the laser light so as to effect photo-thermal conversion and to effectively bring about deterioration and decomposition of the component 2 even with a lesser amount of the light energy to cause thermal decomposition and the gas is generated at this time. Thus it becomes possible to achieve a high recording sensitivity.

It will be noted that, by adjusting the mixing ratio of these two kinds of substances which make up the recording layer, that the complex index of refractivity within the laser wavelength range can be accurate controlled, so that the reflectivity of 70% or higher can be easily obtained. On the other hand, the reflection spectrum within the laser wavelength can be flattened, so that, even when the laser diode is subject to certain fluctuations in the wavelength within the allowable range of +10 percent, stable and high reflectivity may be achieved without the value of reflectivity being appreciably changed.

EXAMPLES

The present invention will be hereinafter explained on the basis of results of practical experiments.

EXPERIMENT 1

In the present experiment, the relation between the values of n and k and the reflectivity of the recording layer was first investigated.

The recording medium, employed in the experiment, was so designed that the recording and/or reproduction was performed through the substrate, and was constructed of a transparent substrate on which a recording layer, a high reflective layer and a protective layer were sequentially stacked in that order.

Figure 2:
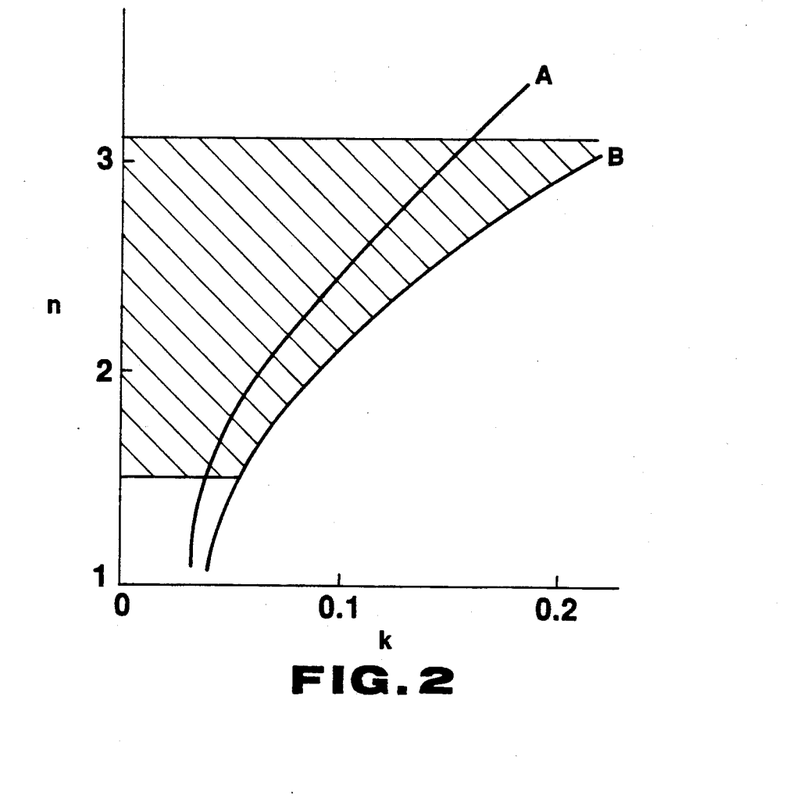
FIG. 2 is a chart showing the relationship between the values of n and k of the recording layer and the reflectivity.

If the transparent base plate was of polycarbonate, with a value of n of 1.58, and the high reflective layer was an deposited gold film with the value of $n^* = 0.15 - 4.5i$ and of 60 nm thick, it was necessary for the complex refractive index of the recording layer to be within a hatched area to the left of a curve A in FIG. 2 to obtain reflectivity of not less than 70%.

This range is changed slightly with the material of the base plate and the film material or thickness, such that, the lower the index of refraction of the transparent substrate, the higher the reflective index of the high reflectivity of the high reflective layer and the thicker the thickness of the high reflective layer, the values tended to be above the desired range.

By way of an example, if the refractive index of the transparent substrate is 1.33, which value is thought to be lowest with the transparent solid substance, and the evaporated silver film having a thickness of 100 nm or more is used as the high reflective layer, the reflectivity of the recording layer was not less than 70 percent, in order for the complex refractive index to be within the hatched area to the left of the curve B in FIG. 2. (It is noted that the evaporated silver film has the highest reflectivity).

EXPERIMENT 2

The media produced were disk-shaped media of 12 cm in diameter associated with a laser diode having a wavelength of 780 nm.

The recording layer was formed by coating a mixed solution of the composition shown in Table 2 on a polycarbonate substrate by a spin coating method. On the recording layer was then deposited gold to a film thickness of 50 to 100 nm by a vacuum evaporator.

TABLE 2

|  | Sample 1 | Sample 2 | sample 3 |
|---|---|---|---|
| n* of Component 1 | cyanine dye A 2.7–1.8 i | Phthalocyanine A 2.0–0.47 i | chanine dye A 2.7–1.8 i |
| n* of Component 2 | cyanine dye B 2.44–0.01 i | Cyanine dye B 2.44–0.01 i | cyanine dye C 2.34–0.002 i |
| mixing ratio by weight (A:B) | 1:50 | 1:10 | 1:40 |
| n* of recording layer | 2.45–0.06 i | 2.4–0.05 i | 2.35–0.08 i |

The following are the structural formula of the dyes shown in the above Table.

Cyanine Dye A: NK 125, produced by Japanese Research Institute for Photosensitizing Dyes Co. Ltd.

Cyanine dye B: NK 529, produced by Japanese Research Institute for Photosensitizing Dyes Co. Ltd.

Cyanine Dye C: NK 1836, produced by Japanese Research Institute for Photosensitizing dyes Co., Ltd.

Phthalocyanine A: hexylaminophthalocyanine

Sample disks for Examples 1 to 3 were produced, using the samples 1 to 3 shown in Table 2 as the composition. The film thicknesses of the recording layer and the reflective layer of the produced sample disks are shown in Table 3.

TABLE 3

|  | Example 1 | Example 2 | Example 3 |
|---|---|---|---|
| recording layer | 1400 Å | 1400 Å | 1400 Å |
| reflecting layer | 600 Å | 430 Å | 600 Å |

Figure 3:
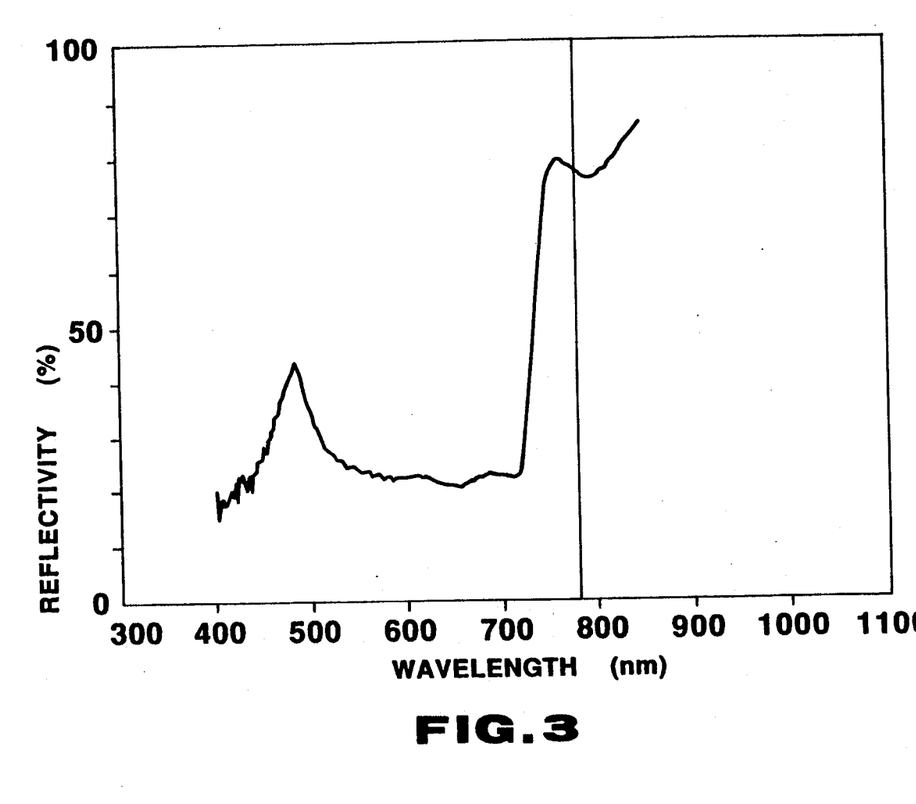
FIG. 3 is a chart showing the reflection spectrum of an embodiment of the optical recording medium to which the present invention is applied.

The reflection spectrum of the sample disk of the Example 1 is shown in FIG. 3.

It is seen from FIG. 3 that the reflectivity reaches 70 percent or higher within the wavelength range of 770 to 790 nm, with the fluctuations in the reflectivity being not more than 5 percent. The similar tendency was noticed with other sample disks (Examples 2 and 3).

The recording properties of the sample disks were investigated. The recording properties were evaluated in terms of the measured value of the C/N ratio of an output signal of a 500 kHz sole signal which was recorded by a near infrared semiconductor laser light of a wavelength of 780 nm and at a laser power of 10.5 mW at a linear velocity 1.2 m/sec and read out by a laser light. The results are shown in Table 4, in which are also shown the results of checking the film uniformities of the recording layers of the respective sample disk.

TABLE 4

|  | Example 1 | Example 2 | Example 3 |
|---|---|---|---|
| recording properties | 45 dB | 47 dB | 50 dB |

TABLE 4-continued

|  | Example 1 | Example 2 | Example 3 |
|---|---|---|---|
| film uniformity | good | good | good |

It may be seen that good recording properties may be achieved with each of the sample disks.

It may also be seen that, while the C/N ratio remained substantially unchanged under the aforementioned condition of the laser power of 10.5 mW in the examples 1 and 2, the C/N ratio was improved from 30 dB for Example 1 to 54 dB for Example 2, for the lower laser power of, for example, 8 mW, thus demonstrating that the condition of Example 2 is preferred to that of Example 1.

It may be seen from above that, in accordance with the present invention, the absorbed light energy, if small, may be effectively converted into thermal energy by the component 1 in the recording layer, that is the substance mainly absorbing the laser, so that the component 2, that is the substance which is mainly deteriorated and decomposed by heating, is gasified to cause the base plate or the metal reflective layer to be deformed to bring about a sufficient differential reflectivity between the exposed and the unexposed portions of the recording medium. Moreover, since the reflectivity of the recording layer is maintained at a sufficiently high value the recording density and the reproduction sensitivity may be improved simultaneously so that a write once type optical recording medium may be realized which has high reliability and which may be employed advantageously for high speed and high density recording.

Inasmuch as satisfactory recording and/or reproducing properties may be obtained by directly depositing the metallic reflective layer on the recording layer, the thickness of the optical data recording medium may be made equal to that of the currently available compact disk so that the optical recording medium may be reproduced by a reproducing apparatus for compact disks.

We claim as our invention:

1. An optical recording medium comprising a transparent substrate, an optical recording layer formed on said transparent substrate, a reflective layer formed on said optical recording layer, said optical recording layer containing a first compound having absorption for a recording laser light having a predetermined wavelength, and a second compound having substantially no absorption for a laser light having said predetermined wavelength and decomposable upon heat generation by said laser light in said optical recording layer, said optical recording layer has a complex refractive index of $n^* = n + ik$, wherein $1.5 \leq n \leq 3.2$, and $0 \leq k \leq 0.2$, said first compound has a complex refractive index of $n^* = n + ik$ wherein $1.5 \leq n \leq 3.2$ and $0.3 \leq k$, and said second compound has a complex refractive index of $n^* = n + ik$, wherein $1.5 \leq n \leq 3.2$, and $k \leq 0.05$ wherein $n^*$ is a complex refractive index and "n" is the real part, "i" is an imaginary part and "k" is an extinction coefficient.

2. An optical recording medium according to claim 1, said first compound has a complex refractive index of $n^* = n + ik$, wherein $1.5 \leq n \leq 3.2$, and $0.3 \leq k \leq 2.0$.

3. An optical recording medium according to claim 1, said second compound has a complex refractive index of $n^* = n + ik$, wherein $1.5 \leq n \leq 3.2$, and $k \leq 0.019$.

4. An optical recording medium according to claim 1, said optical recording layer has a thickness of about said predetermined wavelength divided by 2n, wherein n is an integer.

5. An optical recording medium according to claim 1, said reflective layer has a thickness between 300 and 2000 Å.

6. An optical recording medium according to claim 1, said first compound is selected from the group of cyanine base dyes, metal complex base dyes, phthalocyanine dyes and naphthalocyanine dyes.

7. An optical recording medium comprising a transparent substrate, an optical recording layer formed on said transparent substrate, a reflective layer formed on said optical recording layer, said optical recording layer containing a first compound having absorption for a recording laser light having a predetermined wavelength, and a second compound having substantially no absorption for a laser light having said predetermined wavelength and decomposable upon heat generation by said laser light in said optical recording layer, said first compound is selected from the group of cyanine base dyes, metal complex base dyes, phthalocyanine dyes and naphthalocyanine dyes, and said first compound is substituted aminophthaloscyanines, represented by the following formula, (in the above formula, $K_1$ to $K_4$ stand for a hydrogen atom, an amino group, a substituted amino group or the like, with at least one of $K_1$ to $K_4$ being however a substituted amino group. If two or more of $K_1$ to $K_4$ are substituted amino groups, these substituted amino groups may be the same as or different from each other.)

8. An optical recording medium according to claim 6, said second compound is selected from the group of cyanine dyes, coumarin dyes, alantoin base dyes, azo base dyes, triphenylmethane base dyes, acridine base dyes, oxazine base dyes, bisazo base dyes and xanthene base dyes.

9. An optical recording medium according to claim 7, wherein said second compound is selected from the group of cyanine dyes, coumarin dyes, alantoin base dyes, azo base dyes, triphenylmethane base dyes, acridine base dyes, oxazine base dyes, bisazo base dyes and xanthene base dyes.

* * * * *